(12) United States Patent
Na et al.

(10) Patent No.: US 11,851,727 B2
(45) Date of Patent: Dec. 26, 2023

(54) HOT-ROLLED STEEL SHEET HAVING EXCELLENT EXPANDABILITY AND METHOD FOR MANUFACTURING SAME

(71) Applicant: POSCO Co., Ltd, Pohang-si (KR)

(72) Inventors: Hyun-Taek Na, Gwangyang-si (KR); Seok-Jong Seo, Gwangyang-si (KR)

(73) Assignee: POSCO Co., Ltd., Pohang-si (KR)

(*) Notice: Subject to any disclaimer, the term of this patent is extended or adjusted under 35 U.S.C. 154(b) by 0 days.

(21) Appl. No.: 18/085,061

(22) Filed: Dec. 20, 2022

(65) Prior Publication Data

US 2023/0129303 A1  Apr. 27, 2023

Related U.S. Application Data

(62) Division of application No. 16/956,417, filed as application No. PCT/KR2018/013943 on Nov. 15, 2018, now Pat. No. 11,560,607.

(30) Foreign Application Priority Data

Dec. 21, 2017  (KR) .................. 10-2017-0177510

(51) Int. Cl.
  C21D 9/46      (2006.01)
  B23K 11/00    (2006.01)
  (Continued)

(52) U.S. Cl.
  CPC ............. C21D 9/46 (2013.01); B23K 11/002 (2013.01); B23K 31/027 (2013.01);
  (Continued)

(58) Field of Classification Search
  CPC ...... C21D 9/46; C21D 8/0226; C21D 8/0263; C21D 2211/002; C21D 2211/004;
  (Continued)

(56) References Cited

U.S. PATENT DOCUMENTS

| 2014/0000766 A1 | 1/2014 | Maeda et al. |
| 2014/0161659 A1* | 6/2014 | Murakami ............. C22C 38/06 420/104 |
| 2015/0292054 A1 | 10/2015 | Kami et al. |

FOREIGN PATENT DOCUMENTS

| CN | 101270442 A | 9/2008 |
| CN | 103732779 A | 4/2014 |

(Continued)

OTHER PUBLICATIONS

Extended European Search Report dated Oct. 22, 2020 issued in European Patent Application No. 18890446.0.
(Continued)

Primary Examiner — Nicholas A Wang
Assistant Examiner — Maxwell Xavier Duffy
(74) Attorney, Agent, or Firm — MORGAN, LEWIS & BOCKIUS LLP

(57) ABSTRACT

The present invention relates to steel used for a sash component and the like of a vehicle and, more specifically, to a hot-rolled steel sheet for a high-strength electric resistance welded steel pipe having excellent expandability and a method for manufacturing same, the hot-rolled steel sheet having a smaller decrease in the strength of a welding heat-affected zone (HAZ) formed during electric resistance welding, in comparison with a base material.

2 Claims, 2 Drawing Sheets

F : FERRITE/ B : BAINITE/ M : MARTENSITE
(a)

(b)

(51) Int. Cl.
| | |
|---|---|
| *B23K 31/02* | (2006.01) |
| *C21D 8/02* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/24* | (2006.01) |
| *C22C 38/26* | (2006.01) |
| *C22C 38/28* | (2006.01) |
| *B23K 103/04* | (2006.01) |
| *B23K 101/06* | (2006.01) |

(52) U.S. Cl.
CPC ......... *C21D 8/0226* (2013.01); *C21D 8/0263* (2013.01); *C22C 38/001* (2013.01); *C22C 38/002* (2013.01); *C22C 38/02* (2013.01); *C22C 38/04* (2013.01); *C22C 38/06* (2013.01); *C22C 38/24* (2013.01); *C22C 38/26* (2013.01); *C22C 38/28* (2013.01); *B23K 2101/06* (2018.08); *B23K 2103/04* (2018.08); *C21D 2211/002* (2013.01); *C21D 2211/004* (2013.01); *C21D 2211/005* (2013.01); *C21D 2211/008* (2013.01)

(58) Field of Classification Search
CPC ........ C21D 2211/005; C21D 2211/008; B23K 31/027; B23K 2101/06; B23K 2103/04; C22C 38/04; C22C 38/06
See application file for complete search history.

(56) References Cited

FOREIGN PATENT DOCUMENTS

| | | |
|---|---|---|
| EP | 3395974 A1 | 10/2018 |
| JP | S56-051532 A | 5/1981 |
| JP | H07-150247 A | 6/1995 |
| JP | H08-188847 A | 7/1996 |
| JP | 2000-063955 A | 2/2000 |
| JP | 2009-270171 A | 11/2009 |
| JP | 2011-144425 A | 7/2011 |
| JP | 2012-012697 A | 1/2012 |
| JP | 2017-115191 A | 6/2017 |
| KR | 10-2013-0116329 A | 10/2013 |
| KR | 10-2014-0012490 A | 2/2014 |
| KR | 10-2014-0083787 A | 7/2014 |
| KR | 10-2014-0138854 A | 12/2014 |
| KR | 10-1630982 B1 | 6/2016 |
| KR | 10-2019-0049154 A | 5/2019 |

OTHER PUBLICATIONS

H. Berns, et al., "Ferrous Materials," Steel and Cast Iron, Dec. 31, 2008.
U.S. Notice of Allowance dated Sep. 19, 2022 issued in U.S. Appl. No. 16/956,417.
Japanese Office Action dated Apr. 21, 2022 issued in Japanese Patent Application No. 2020-534947.
U.S. Non-Final Office Action dated Apr. 8, 2022 issued in U.S. Appl. No. 16/956,417.
H. Yang, et al., "Experimental study of single sided sheet to tube resistance spot welding," Aug. 2007, Institute of Materials, Minerals and Mining, Science and Technology of Welding and Joining, 2007, vol. 12, No. 6, pp. 530-535.
International Search Report dated Feb. 15, 2019 issued in International Patent Application No. PCT/KR2018/013943 (along with English translation).
Chinese Office Action dated Mar. 29, 2021 issued in Chinese Patent Application No. 201880082627.2.
T. Fengzhao, "Engineering Materials," Shanghai Jiatong University Press, Feb. 1987, pp. 1-9.

* cited by examiner

[FIG. 1]
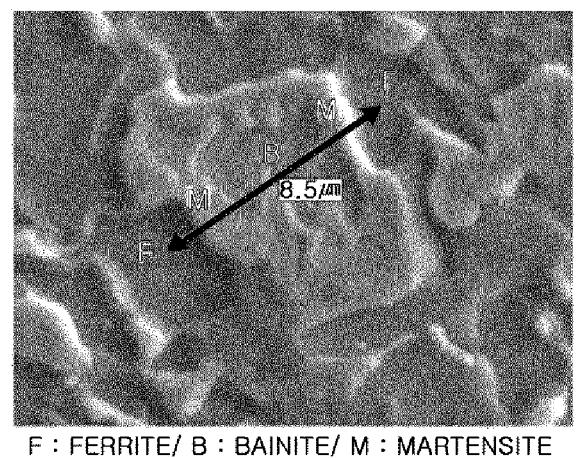
F : FERRITE/ B : BAINITE/ M : MARTENSITE
(a)
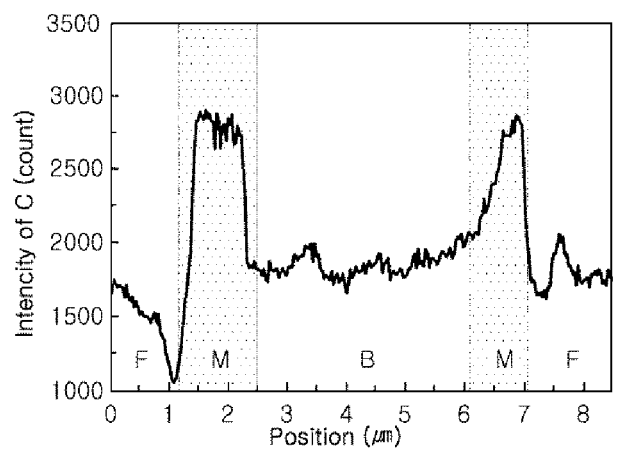
(b)

[FIG. 2]
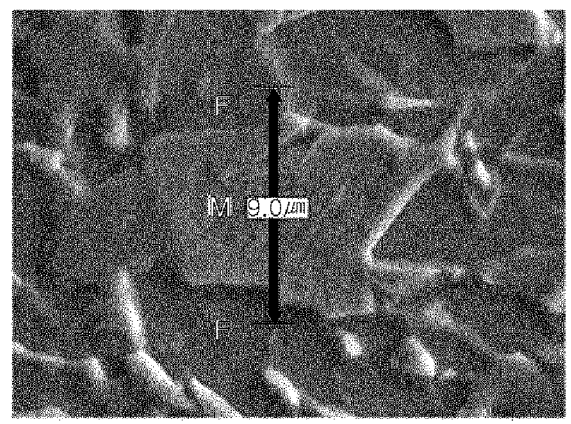
F : FERRITE / M : MARTENSITE
(a)
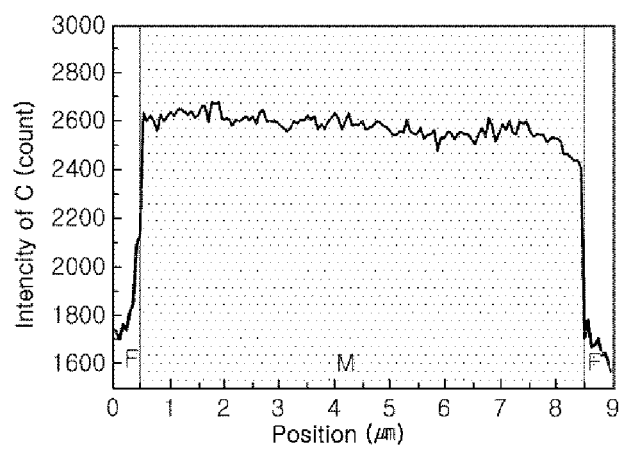
(b)

HOT-ROLLED STEEL SHEET HAVING EXCELLENT EXPANDABILITY AND METHOD FOR MANUFACTURING SAME

CROSS-REFERENCE TO RELATED APPLICATION(S)

This application is a divisional of U.S. patent application Ser. No. 16/956,417, filed on Jun. 19, 2020 which is the U.S. National Phase under 35 U.S.C. § 371 of International Patent Application No. PCT/KR2018/013943, filed on Nov. 15, 2018, which claims benefit under 35 USC 119(a) of Korean Patent Application No. 10-2017-0177510 filed on Dec. 21, 2017, the entire disclosures of which are incorporated herein by reference for all purposes.

TECHNICAL FIELD

The present invention relates to steel used for chassis parts and the like of a vehicle and, more specifically, to a hot-rolled steel sheet for an electric resistance welded steel pipe having excellent expandability and a method for manufacturing the same.

BACKGROUND ART

Recently, the automobile industry is increasing the adoption of high-strength steel materials that can simultaneously secure fuel efficiency and collision safety at a relatively low cost in order to regulate fuel efficiency for preservation of the global environment and to secure collision safety of passengers. The movement for weight reduction is the same for chassis parts as well as for vehicle bodies.

In general, the properties required for steel materials for vehicle bodies include strength and an elongation for forming, spot weldability required for assembly, and the like.

In addition to the strength and elongation required for forming due to the characteristics of the parts, the steel materials for chassis parts are required to have arc weldability applied when assembling the parts and fatigue properties to ensure the durability of the parts.

Particularly, in the chassis parts, such as Coupled Torsion Beam Axle (CTBA), hollow pipes are formed and used to simultaneously secure rigidity and lightweightedness, and for additional lightweightedness, high strengthening of the material has also been made.

Since the material used as a pipe member as described above generally manufactures a pipe through electric resistance welding, roll forming properties of the material, during pipemaking, and cold formability after pipemaking is very important, together with electric resistance weldability. Therefore, it is very important to secure integrity of a welding zone during electric resistance welding as a physical property of the material. The reason is because most fractures are concentrated in a welding zone or a welding heat-affected zone, due to deformation during forming of the electric resistance welded pipe, in comparison with a base material.

In order to improve the roll forming properties during pipemaking of the material, it is advantageous that a yield ratio of a material is as low as possible. When the material is a high-strength steel material, when yield strength is high and thus a yield ratio is increased, there is a problem in that spring back may become severe during roll forming and it is difficult to secure out-of-roundness.

In order to finally perform cold forming using a pipe, it is also required to secure the elongation of the material, and to satisfy this, a steel material having excellent elongation while having a low yield ratio is basically required. As a material capable of satisfying these characteristics, a low yield ratio-type hot-rolled steel sheet, called dual phase (DP) steel, is representative.

The conventional low yield ratio-type hot-rolled steel sheet is dual composite structure steel of ferrite-martensite, and exhibits a continuous yield behavior and low yield strength characteristics by a movable dislocation introduced during martensite transformation, and has excellent elongation characteristics.

In order to secure such physical properties, it was conventionally controlled by a component system containing a large amount of Si in steel for the purpose of stably securing a ferrite fraction during cooling after hot rolling.

However, when a pipe is manufactured by an electric resistance welding method, a large amount of Si oxides is generated in a melted portion, which causes a problem of causing a penetrator defect in the welding zone. Also, after ferrite transformation, it is rapidly cooled below a martensitic transformation start temperature (Ms) to obtain martensite, and in this case, if a residual phase consists of only pure martensite, there is a problem in that a drop in strength due to heat increases during welding. Particularly, a drop in hardness ($\Delta Hv$) of the welding heat-affected zone is generated in excess of 30.

Meanwhile, as a method for reducing the above-described hardness drop phenomenon, if a pure bainite phase is obtained by rapidly cooling it below a bainite transformation start temperature (Bs) after ferrite transformation, the drop in hardness can be reduced, but there is a problem in that the yield strength is increased and the elongation is lowered.

(Patent Document 1) Japanese Patent Laid-Open Publication No. 2000-063955

DISCLOSURE

Technical Problem

An aspect of the present disclosure is to provide a hot-rolled steel sheet for a high-strength electric resistance steel pipe having excellent expandability and a method for manufacturing the same, the hot-rolled steel sheet having a smaller drop in strength of a welding heat-affected zone (HAZ) formed during electric resistance welding, in comparison with a base material.

Technical Solution

According to an aspect of the present disclosure, a hot-rolled steel sheet for an electric resistance welded steel pipe having excellent expandability is provided. The steel sheet includes, 0.15 wt % to 0.22 wt % of carbon (C), 0.1 wt % to 1.0 wt % of silicon (Si), 0.8 wt % to 1.8 wt % of manganese (Mn), 0.001 wt % to 0.03 wt % of phosphorus (P), 0.001 wt % to 0.01 wt % of sulfur (S), 0.001 wt % to 0.19 wt % % of soluble aluminum (Sol.Al), 0.3 wt % to 1.0 wt % of chromium (Cr), 0.01 wt % to 0.05 wt % of titanium (Ti), 0.025 wt % or less of niobium (Nb), 0.035 wt % or less of vanadium (V), 0.001 wt % to 0.01 wt % of nitrogen (N), and a balance of iron (Fe) and other inevitable impurities, wherein the Mn and Si satisfy the following Relational Expression 1, wherein a microstructure includes a ferrite phase as a matrix structure and a hard phase composed of martensite and bainite phases, and a fraction of a grain in which the martensite phase and the bainite phase are mixed in a single grain of an entire fraction (area fraction) of the hard phase is 50% or more, and a carbon distribution in the grain satisfies the following Relational Expression 2, $$4 < Mn/Si < 12 \quad \text{[Relational Expression 1]}$$

where, Mn and Si mean the weight content of each element.

$$1.2 \leq P_{CB}/P_{CC} \leq 2.0 \quad \text{[Relational Expression 2]}$$

where, $P_{CB}$ means a measured value of EPMA intensity of carbon at 70% point of a distance from a center of the grain in which the martensite and bainite phases are mixed in the hard phase to a boundary of the grain, and $P_{CC}$ means a measured value of the EPMA intensity of carbon at a central point of the same grain.

According to another aspect of the present disclosure, a method for manufacturing a hot-rolled steel sheet for an electric resistance welded steel pipe having excellent expandability is provided. The method for manufacturing the same includes steps of:
  reheating a steel slab satisfying the alloy composition described above and the Relational Expression 1 in a temperature range of 1180 to 1300° C.;
  finish hot rolling the reheated steel slab at a temperature of Ar3 or higher to prepare a hot-rolled steel sheet;
  first cooling the hot-rolled steel sheet at a cooling rate of 20° C./s or more to a temperature range of 550 to 750° C.;
  second cooling the hot-rolled steel sheet at a cooling rate of 0.05 to 2.0° C./s within a range satisfying the following Relational Expression 3 after the first cooling;
  third cooling the hot-rolled steel sheet at a cooling rate of 20° C./s or more to a temperature range of room temperature to 400° C., after the second cooling; and
  coiling the hot-rolled steel sheet after the third cooling.

$$0 \leq t - ta \leq 3 \quad \text{[Relational Expression 3]}$$

where, $[ta=250+(65.1[C])+(9.2[Mn])+(20.5[Cr])-(4.7[Si])-(4.8[Sol.Al])-(0.87\text{Temp})+(0.00068\text{Temp}^2)]$, where, t is a second cooling maintaining time (seconds, sec.), ta is a second cooling maintaining time (seconds, sec.) to secure an optimal phase fraction (seconds, sec.), and Temp is a second cooling intermediate temperature, which means a temperature of a middle point between a second cooling start point and cooling end point. Each alloy component means a weight content.

Another aspect of the present disclosure is to provide an electric resistance welded steel pipe having excellent expandability that is manufactured by electric resistance welding the above-described hot-rolled steel sheet.

Advantageous Effects

According to the present disclosure, it is possible to provide a hot-rolled steel sheet having a high-strength of a tensile strength of 980 MPa or more and a low yield ratio. When the hot-rolled steel sheet is electric resistance welded, defects in a welding zone may not only be suppressed, and but also a drop in hardness of a welding heat-affected zone may be minimized.

In addition, it is possible to ensure excellent cold formability without cracking in a welding zone or a weld heat-affected zone during pipemaking after welding and expanding the pipes.

DESCRIPTION OF DRAWINGS

FIG. 1 shows a photograph (a) observing a shape of a structure occupying 50% or more as an area ratio in an entire hard phase of Inventive Example 1 according to an embodiment of the present disclosure and a distribution (b) of a content of carbon (C) measured for each section of the structure using an Electro Probe X-ray Micro Analyzer (EPMA).

FIG. 2 shows a photograph (a) observing a shape of a structure of a hard phase of conventional DP steel and a distribution (b) of a content of carbon (C) measured for each section of the structure using an Electro Probe X-ray Micro Analyzer (EPMA).

BEST MODE FOR INVENTION

The present inventors have studied in detail to manufacture a hot-rolled steel sheet of a 980 MPa level wherein a yield ratio is controlled to be 0.8 or less, facilitating roll forming for pipemaking, and has excellent electrical resistance weldability as well as a small drop in strength of a weld heat-affected zone, and excellent cold formability without fractures in a welding zone or a welding heat-affected zone during pipe expansion processing after pipemaking.

As a result, it has been confirmed that the hot-rolled steel sheet for an electric resistance welded steel pipe having excellent expandability while having high strength, by forming a microstructure advantageous for securing the above-described properties, by optimizing the alloy composition and manufacturing conditions of the steel material, thereby resulting in completion of the present disclosure.

Hereinafter, the present disclosure will be explained in detail.

According to an aspect of the present disclosure, a hot-rolled steel sheet for an electric resistance welded steel pipe having excellent expandability preferably includes, 0.15 wt % to 0.22 wt % of carbon (C), 0.1 wt % to 1.0 wt % of silicon (Si), 0.8 wt % to 1.8 wt % of manganese (Mn), 0.001 wt % to 0.03 wt % of phosphorus (P), 0.001 wt % to 0.01 wt % of sulfur (S), 0.001 wt % to 0.19 wt % of soluble aluminum (Sol.Al), 0.3 wt % to 1.0 wt % of chromium (Cr), 0.01 wt % to 0.05 wt % of titanium (Ti), 0.025 wt % or less of niobium (Nb), 0.035 wt % or less of vanadium (V), and 0.001 wt % to 0.01 wt % of nitrogen (N).

Hereinafter, the reason for limiting the alloy composition of the hot-rolled steel sheet provided in the present disclosure as described above will be described in detail. In this case, unless otherwise specified, the content of each element is by weight.

Carbon (C): 0.15% to 0.22%

Carbon (C) is the most economical and effective element for reinforcing steel. If an additive amount thereof increases, a fraction of low-temperature transformation phases such as bainite and martensite increases in composite structure steel composed of ferrite, bainite, and martensite, such that tensile strength is improved.

In the present disclosure, if the content of C is less than 0.15%, it is difficult to easily form a low-temperature transformation phase during cooling after hot rolling, and thus it is impossible to secure strength of a target level. On the other hand, if the content of C exceeds 0.22%, the strength is excessively increased, and there is a problem in that weldability, formability and toughness are lowered.

Therefore, in the present disclosure, the content of C is preferably controlled to be 0.15% to 0.22%. More preferably, the content of C is controlled to be 0.17% to 0.21%.

Silicon (Si): 0.1% to 1.0%

Silicon (Si) is an element deoxidizing molten steel and having a solid solution strengthening effect, and silicon (Si) is a ferrite stabilizing element, and has an effect of promoting ferrite transformation during cooling after hot rolling. Therefore, Si is an effective element for increasing a ferrite fraction constituting a matrix of composite structure steel of ferrite, bainite and martensite.

If the content of Si is less than 0.1%, a ferrite stabilizing effect is small, and thus it is difficult to form the matrix structure into a ferrite structure. On the other hand, if the content of Si is exceeds 0.1%, when it is hot-rolled, a red scale formed by Si is formed on a surface of a steel sheet, so that a surface quality of the steel sheet is not only deteriorated, but also ductility and electrical resistance weldability are lowered.

Therefore, in the present disclosure, the content of Si is preferably controlled to be 0.1% to 1.0%. More preferably, the content of Si is controlled to be 0.15% to 0.8%.

Manganese (Mn): 0.8% to 1.8%

Manganese (Mn) is an effective element for solid solution strengthening of steel together with the Si. Manganese (Mn) increases hardenability of steel to facilitate formation of bainite or martensite phases during cooling after hot rolling.

However, if the content of Mn is less than 0.8%, the above-described effect may not be obtained. On the other hand, if the content of Mn exceeds 1.8%, it is difficult to secure an appropriate fraction of the ferrite phase by excessively delaying ferrite transformation, and when casting slabs in a continuous casting process, a segregation part is greatly developed in a thickness central portion, which causes electrical resistance weldability of a final product to be damaged.

Thus, in the present disclosure, the content of Mn is preferably controlled to be 0.8% to 1.8%. More preferably, the content of Mn is controlled to be 1.0% to 1.75%.

Phosphorus (P): 0.001% to 0.03%

Phosphorus (P) is an impurity present in steel, and if the content of P exceeds 0.03%, phosphorus (P) deteriorates ductility due to micro segregation and inferior impact properties of steel. However, to manufacture that the content of P is less than 0.001%, it takes a lot of time during a steelmaking operation, and there is a problem in that productivity is greatly reduced.

Therefore, in the present disclosure, the content of P is preferably controlled to be 0.001 to 0.03%.

Sulfur (S): 0.001% to 0.01%

Sulfur (S) is an impurity present in steel, and if the content of S exceeds 0.01%, S combines with Mn or the like to form a non-metallic inclusion, and thus there is a problem that toughness of the steel is greatly reduced. However, to manufacture that the content of S is less than 0.001%, there is a problem in that productivity is deteriorated because it takes a lot of time during a steelmaking operation.

Therefore, in the present disclosure, the content of s is preferably controlled to be 0.001 to 0.01%.

Soluable Aluminum (Sol.Al): 0.001% to 0.19%

Soluable Aluminum (Sol.Al) is a ferrite stabilizing element and is an effective element for forming a ferrite phase during cooling after hot rolling If the content of Sol.Al is less than 0.001%, an additive effect is insufficient, and thus the above-described effect cannot be sufficiently obtained, and there is a problem in that productivity is remarkably lowered because it takes a lot of time during a steelmaking operation. On the other hand, if the content of Sol.Al exceeds 0.19%, generation of Al-based oxides (e.g., $Al_2O_3$) having a relatively high melting point is facilitated during electric resistance welding, and stress is locally concentrated around the inclusion during expansion, which may cause crack initiation.

Therefore, in the present disclosure, the content of Sol.Al is preferably controlled to be 0.001 to 0.19%, more preferably 0.003 to 0.15%, and even more preferably 0.003 to 0.10%.

Chromium (Cr): 0.3% to 1.0%

Chromium (Cr) serves to solid strengthen steel, delays ferrite phase transformation during cooling to facilitate the formation of martensite, like Mn.

If the content of Cr is less than 0.3%, the above-described effect cannot be sufficiently obtained. On the content of Cr exceeds 1.0%, the ferrite transformation is excessively delayed, so that a fraction of low-temperature transformation phases such as bainite or martensite phases increases more than necessary, and thus the elongation rate is rapidly deteriorated.

Thus, in the present disclosure, the content of Cr is preferably controlled to be 0.3% to 1.0%. More preferably, the content of Cr may be controlled to be 0.4% to 0.8%.

Titanium (Ti): 0.01% 0.05%

Titanium (Ti) combines with nitrogen (N) to form a coarse precipitate during continuous casting, and when reheating for a hot rolling process, a portion thereof remains unresolved and remains in the material. The unresolved precipitate has a high melting point even during welding and is unresolved, such that it serves to suppress grain growth of the heat-affected zone.

In addition, the resolved Ti is finely precipitated during a phase transformation process during the cooling process after hot rolling, thereby effectively improving the strength of the steel.

In order to sufficiently obtain the above-described effect, it is preferable to contain Ti in an amount of 0.01% or more, but if the content of Ti exceeds 0.05%, the yield ratio of steel is increased by the fine precipitated precipitate, which makes it difficult for roll forming during pipemaking.

Therefore, in the present disclosure, the content of Ti is preferably controlled to be 0.01% to 0.05%.

Niobium (Nb): 0.025% or Less (Excluding 0%)

Niobium (Nb) is an element that serves to improve strength by forming a precipitate in a form of a carbonitride, and particularly, a precipitate, finely precipitated in a phase transformation process during the cooling process after hot rolling greatly improves the strength of the steel.

If the content of Nb exceeds 0.025%, it is not preferable because the yield ratio of the steel is greatly increased to make roll forming during pipemaking difficult. Therefore, in the present disclosure, the content of Nb is preferably controlled to be 0.025% or less, 0% is excluded.

Vanadium (V): 0.035% or Less (Excluding 0%)

Vanadium (V) is an element that serves to improve strength by forming a precipitate in a form of a carbonitride, and particularly, a precipitate, finely precipitated in a phase transformation process during the cooling process after hot rolling greatly improves the strength of the steel.

If the content of V exceeds 0.035%, it is not preferable because the yield ratio of the steel is greatly increased to make roll forming during pipemaking difficult. Therefore, in the present disclosure, the content of V is preferably controlled to be 0.035% or less, 0% is excluded.

Nitrogen (N): 0.001% to 0.01%

Nitrogen (N) is a representative solution strengthening element together with the C, and forms a coarse precipitate with titanium, aluminum, and the like.

In general, the solid solution strengthening effect of N is better than that of C, but as an amount of N increases in the steel, there is a problem in that the toughness is greatly reduced. Thus, in the present disclosure, an upper limit of the N is preferably limited to 0.01%. However, to manufacture that the content of N is less than 0.001%, it takes a lot of time during a steelmaking operation, and thus productivity is deteriorated.

Therefore, in the present disclosure, the content of N is preferably controlled to be 0.001 to 0.01%.

In the present disclosure, it is preferable that the manganese (Mn) and silicon (Si) controlled by the above-described content satisfy the following Relational Expression 1.

$$4<Mn/Si<12 \quad \text{[Relational Expression 1]}$$

where, Mn and Si refer to a weight content of each element.

When a value of the Relational Expression 1 is 4 or less or 12 or more, it is not preferable because Si oxides or Mn oxides are excessively generated in a welding zone during manufacturing an electric resistance welded steel pipe, thereby increasing an occurrence rate of defects in a penetrator. This is because a melting point of the oxide generated in a melting portion increases during manufacturing the electric resistance welded steel pipe, so that a probability of remaining in the welding zone during compressing and discharging increases.

Therefore, in the present disclosure, it is preferable to satisfy the above-described content range and at the same time satisfy the Relational Expression 1.

A remaining component of the present disclosure is iron (Fe). However, in the general manufacturing process, impurities that are not intended from a raw material or a surrounding environment can be inevitably mixed, and therefore cannot be excluded. Since these impurities can be known to anyone skilled in the ordinary manufacturing process, they are not specifically mentioned in the present specification.

In the hot-rolled steel sheet of the present disclosure satisfying the above-described alloy composition and the Relational Expression 1, it is preferable that a microstructure includes a ferrite phase as a matrix structure and a hard phase composed of martensite and bainite.

In this case, the ferrite phase is preferably included in an area fraction of 60 to 80%. If the fraction of the ferrite phase is less than 60%, the elongation of the steel may drop rapidly. On the other hand, if the fraction thereof exceeds 80%, the fraction of the hard phase (bainite and martensite) relatively decreases, so that the target strength cannot be secured.

In the present disclosure, it is preferable to include a crystal grain in which the martensite (M) phase and bainite (B) phase are mixed in the hard phase, that is, the M phase and the B phase are present in a prior austenite grain. It is more preferable to include the crystal grain in 50% or more of the total hard phase fraction (area fraction). The portion remaining in the hard phase except for the crystal grain in which the M phase and the B phase are mixed is a martensitic single phase and/or a bainite single phase structure.

Referring to the drawings, FIG. 1 shows a structure picture (a) of Inventive steel according to an embodiment of the present disclosure, specifically, shows a result of measuring a result of a grain of a structure occupying 50% or more in an area ratio in the entire hard phase and a carbon content (b) of the grain for each section, and it can be confirmed that there is a difference in the carbon content around the grain boundary of the grain and the carbon content in the central region. This means that there is a martensitic phase around a grain boundary and a bainite phase at a center thereof within a single grain in which the martensite phase and the bainite phase are mixed.

FIG. 2 shows a structure photograph (a) of conventional steel having a structure of general DP steel, that is, a result of measuring the martensite grain occupying 90% or more in an area ratio in the hard phase, and the carbon content (b) of the grain thereof. In contrast to the present disclosure, it can be confirmed that the carbon distribution from the grain boundary to the center of the grain is relatively uniform.

As described above, the hot-rolled steel sheet of the present disclosure can sufficiently secure the bainite phase differently from the existing DP steel, and at the same time, introduce a sufficient movable dislocation at the boundary between the hard phase and the ferrite phase, thereby minimizing the drop in hardness at the weld heat-affected zone. At the same time, it has the effect of securing excellent expandability of the electric resistance welded steel pipe by realizing a low yield ratio.

More specifically, the hot-rolled steel sheet of the present disclosure preferably contains 50% or more of the total fraction (area fraction) of the hard phase in which a martensitic phase and a bainite phase are mixed in a single grain. It is preferable that the carbon distribution in the grain satisfies the following Relational Expression 2.

If the carbon distribution represented by the following Relational Expression 2 is less than 1.2, the grain in which the martensite and bainite phases are mixed in the hard phase are not realized, and the martensitic single phase structure is formed, and thus the target of the present disclosure may not be achieved. On the other hand, if the value thereof exceeds 2.0, martensite in a form of a needle is formed around the grain boundary, and a ferrite phase, rather than bainite, is formed in the central region, whereby the expandability is greatly inferior.

$$1.2 \leq P_{CB}/P_{CC} \leq 2.0 \quad \text{[Relational Expression 2]}$$

where, $P_{CB}$ means a measure value of EPMA intensity of carbon at 70% point of a distance from a center of the grain in which the martensite and bainite phases are mixed in the hard phase to a boundary of the grain, and $P_{CC}$ means a measurement value of the EPMA intensity of carbon at a central point of the same grain.

As described above, the hot-rolled steel sheet of the present disclosure satisfying all of the alloy composition, Relational Expression 1, and microstructure has a tensile strength of 980 MPa or more, and may secure a yield ratio (YR=YS/TS) of 0.8 or less.

In addition, when pipemaking the hot-rolled steel sheet of the present disclosure, the expansion ratio of the pipe may be secured to 85% or more compared to the elongation of the hot-rolled steel sheet.

Hereinafter, a method for manufacturing a hot-rolled steel sheet for an electric resistance welded steel pipe having excellent expandability provided by the present disclosure, which is another aspect of the present disclosure, will be described in detail.

Briefly, in the present disclosure, a target hot-rolled steel sheet may be manufactured through processes [Reheating steel slab-hot rolling-first cooling-second cooling-third cooling-coiling], and detailed description of each condition for each step will be described below.

[Reheating Step]

First, it is preferable to prepare a steel slab satisfying the above-described alloy composition and the Relational Expression 1, and then reheat the steel slab in a temperature range of 1180 to 1300° C.

If the reheating temperature is less than 1180° C., it is difficult to secure the temperature during subsequent hot rolling due to insufficient thermal maturation of the slab, and it is difficult to solve segregation generated during continuous casting through diffusion. In addition, it is difficult to obtain a precipitation strengthening effect in a process after hot rolling because precipitates, precipitated during the continuous casting are not sufficiently resolved. On the other hand, if the temperature thereof exceeds 1300° C., the strength decreases due to abnormal grain growth of austenite crystal grains, and there may be a problem in that non-uniform structure may be promoted.

Therefore, in the present disclosure, reheating the steel slab is preferably performed at 1180 to 1300° C.

[Hot Rolling Step]

It is preferable to manufacture a hot-rolled steel sheet by hot rolling the reheated steel slab as described above. In this case, finish hot rolling is preferably performed at Ar3 (ferrite phase transformation start temperature) or higher.

If the temperature during the finish hot rolling is less than Ar3, it is difficult to secure the target structure and physical properties since rolling is performed after ferrite transformation. On the other hand, when the temperature thereof exceeds 1000° C., there is a problem of increasing scale defects on the surface.

Therefore, in the present disclosure, the finish hot rolling is preferably performed in a temperature range satisfying Ar3 to 1000° C.

[First Cooling Step]

It is preferable to cool the hot-rolled steel sheet obtained by hot rolling according to the above, and cooling is preferably performed stepwise.

First, it is preferable to perform first cooling of the hot-rolled steel sheet at a cooling rate of 20° C./s or more to a temperature range of 550 to 750° C.

If the temperature at which the first cooling ends is less than 550° C., the microstructure in steel mainly includes a bainite phase, and thus as a ferrite phase cannot be obtained as a matrix structure, sufficient elongation and a low yield ratio cannot be secured. On the other hand, if the temperature exceeds 750° C., coarse ferrite and pearlite structures are formed, so that desired physical properties cannot be secured.

In addition, when cooling is performed to the above-described temperature range, when cooling is performed at a cooling rate of less than 20° C./s, ferrite and pearlite phase transformation occurs during cooling, so that a desired level of hard phase cannot be secured. An upper limit of the cooling rate is not particularly limited, and may be appropriately selected in consideration of cooling equipment.

[Second Cooling Step]

It is preferable to cool the hot-rolled steel sheet in which the first cooling ends under a specific condition in a ultra-slow cooling section. More specifically, it is preferable to perform ultra-slow cooling at a cooling rate of 0.05 to 2.0° C./s within a range satisfying the following Relational Expression 3.

$$0 \leq t - ta \leq 3 \quad \text{[Relational Expression 3]}$$

where, the ta is $[250+(65.1[C])+(9.2[Mn])+(20.5[Cr])-(4.7[Si])-(4.8[Sol.Al])-(0.87Temp)+(0.00068Temp^{2})]$, where t refers to a second cooling maintaining time (seconds, sec.), ta is a second cooling maintaining time to secure an optimal phase fraction (seconds, sec.), and Temp refers to a second cooling intermediate temperature, which means a temperature of an intermediate point between the second cooling start point and the second cooling end point. Each alloy component means a weight content.

The Relational Expression 3 is for obtaining a microstructure targeting the present disclosure, specifically, a microstructure satisfying the aforementioned Relational Expression 2. In particular, by optimizing an intermediate temperature (Temp) in a ultra-slow cooling section and a maintaining time in a ultra-slow cooling section, 50% or more of the total fraction of the hard phase can be obtained as a structure in which the martensite phase and bainite phase are mixed, as well as the carbon distribution of the structure can satisfy the Relational Expression 2.

More specifically, when a ferrite phase transformation from austenite occurs during the first cooling or ultra-slow cooling section maintaining time (second cooling), the diffusion of carbon into residual austenite occurs. In this case, by controlling the intermediate temperature (Temp) and the maintaining time of the ultra-slow cooling section so as to satisfy the above Relational Expression 3, the carbon concentration increases rapidly only in a portion adjacent to the ferrite. When rear end cooling is started in this state, a portion thereof are transformed into bainite and a portion thereof are transformed to martensite due to a difference in the carbon concentration, so that it is possible to secure a structure satisfying the Relational Expression 2.

If the above Relational Expression 3 is not satisfied during the second cooling control, a structure in which the martensitic phase and the bainite phase are mixed cannot be realized, and a general DP steel structure is formed, so that a drop in hardness at the weld heat-affected zone during electrical resistance welding increases, resulting in deteriorating expandability.

In addition, if the cooling rate exceeds 2.0° C./s during the second cooling control, sufficient time for forming a carbon distribution of a structure in which the martensite phase and bainite phase are mixed in the hard phase cannot be secured, whereas if the cooling rate is less than 0.05° C./s, the ferrite fraction is excessively increased, so that the target structure and physical properties cannot be secured.

[Third Cooling Step]

After completing the second cooling in the ultra-slow cooling section, it is preferable to perform third cooling at a cooling rate of 20° C./s or higher to a temperature range of room temperature to 400° C. Here, room temperature refers to a range of around 15 to 35° C.

If the temperature at which the third cooling ends exceeds 400° C., the temperature thereof becomes Ms (a martensitic transformation start temperature) or higher, so that most of the remaining untransformed phase is transformed into a bainite phase and then a microstructure satisfying the Relational Expression 2 of the present disclosure cannot be obtained.

In addition, if the cooling rate during the third cooling is less than 20° C./s, the bainite phase is excessively formed, so that properties and microstructures targeted in the present disclosure cannot be obtained. An upper limit of the cooling rate is not particularly limited, and may be appropriately selected in consideration of cooling equipment.

[Coiling Step]

It is preferable to perform a process of coiling the hot-rolled steel sheet completed up to third cooling at the temperature according to the above.

Meanwhile, the present disclosure may further include a step of removing a scale of a surface layer by pickling after natural cooling the coiled hot-rolled steel sheet in a temperature range of room temperature to 200° C., then oiling it. In this case, if the temperature of the steel sheet before the pickling treatment exceeds 200° C., there is a problem that a surface layer portion of the hot-rolled steel sheet was over-pickled and roughness of the surface layer portion deteriorates.

The present disclosure provides an electric resistance welded steel pipe manufactured by electric resistance welding a hot-rolled steel sheet manufactured according to the above, wherein the electric resistance welded steel pipe has excellent expandability.

Hereinafter, the present disclosure will be described in more detail through examples. However, it is necessary to note that the following examples are only intended to illustrate the present disclosure in more detail and are not intended to limit the scope of the present disclosure. This is because the scope of the present disclosure is determined by matters described in the claims and able to be reasonably inferred therefrom.

MODE FOR INVENTION

Example

After preparing a steel slab having a component system, illustrated in Table 1 below, the respective steel slabs were heated to 1250° C., and then finish hot rolling was performed (a finish hot rolling temperature is indicated in Table 2) was performed to prepare a hot-rolled steel sheet having a thickness of 3 mmt. Thereafter, first cooling was performed at a cooling rate of 80° C./s (the cooling end temperature is indicated in Table 2), and then control cooling (second cooling) was performed with the intermediate temperature and the maintaining time in the ultra-slow cooling section shown in Table 2 below, and then third cooling was performed to room temperature at a cooling rate of 60° C./s, and then coiling was performed.

An area fraction (area %) of each phase (ferrite: F, martensite: M, bainite: B) after 3000-times zoomed SEM images for each of the hot-rolled steel sheets prepared according to the above was measured using an image analyzer. A distribution behavior of carbon (C) was measured by using an EPMA line scanning technique at 20-35 nm intervals at 7000 times magnification within the grains of structures occupying more than 50% of the total fraction in the hard phase (Acc V: 15.0 kV, Prob C: 1.009e-007 A).

In addition, a JIS 5 specimen was prepared for each hot-rolled steel sheet, and a tensile test was performed at room temperature at a deformation rate of 10 mm/min.

An expansion test was conducted according to KS standard B ISO 8493 (a metal material—a pipe—an expansion test) standard or a standard equivalent thereto after making pipes with a diameter of 101.6 (by an electric resistance welding method using each of the hot-rolled steel sheets. In this case, an expansion ratio of the pipe that was pipemade was compared with the elongation of the hot-rolled steel sheet.

Respective results measured above were shown in Table 3 below.

TABLE 1

| | Alloy Composition (wt %) | | | | | | | | | | | |
|---|---|---|---|---|---|---|---|---|---|---|---|---|
| | C | Si | Mn | P | S | Cr | Ti | Nb | V | Sol · Al | N | RE 1 |
| IS 1 | 0.19 | 0.25 | 1.42 | 0.02 | 0.003 | 0.5 | 0.01 | 0.01 | 0.01 | 0.022 | 0.004 | 5.7 |
| IS 2 | 0.21 | 0.23 | 1.03 | 0.02 | 0.003 | 0.7 | 0.01 | 0.01 | 0.01 | 0.021 | 0.004 | 4.5 |
| IS 3 | 0.19 | 0.25 | 1.51 | 0.01 | 0.003 | 10.6 | 0.01 | 0.01 | 0.01 | 0.009 | 0.003 | 6.0 |
| IS 4 | 0.19 | 0.15 | 1.31 | 0.01 | 0.004 | 0.5 | 0.01 | 0.01 | 0.01 | 0.015 | 0.003 | 8.7 |
| IS 5 | 0.17 | 0.39 | 1.72 | 0.01 | 0.004 | 0.5 | 0.01 | 0.01 | 0.01 | 0.092 | 0.004 | 4.4 |
| IS 6 | 0.19 | 0.35 | 1.69 | 0.02 | 0.003 | 0.5 | 0.01 | 0.01 | 0.01 | 0.074 | 0.003 | 4.8 |
| IS 7 | 0.21 | 0.22 | 1.41 | 0.01 | 0.003 | 0.6 | 0.01 | 0.01 | 0.01 | 0.011 | 0.005 | 6.4 |
| IS 8 | 0.19 | 0.28 | 1.19 | 0.02 | 0.004 | 0.7 | 0.01 | 0.02 | 0.01 | 0.003 | 0.003 | 4.3 |
| IS 9 | 0.21 | 0.29 | 1.25 | 0.02 | 0.005 | 0.6 | 0.04 | 0.01 | 0.01 | 0.002 | 0.004 | 4.3 |
| IS 10 | 0.21 | 0.22 | 1.11 | 0.01 | 0.003 | 0.5 | 0.01 | 0.01 | 0.03 | 0.028 | 0.008 | 5.0 |
| CS 1 | 0.29 | 0.23 | 1.42 | 0.01 | 0.003 | 0.5 | 0.03 | 0.01 | 0.01 | 0.002 | 0.003 | 6.2 |
| CS 2 | 0.14 | 0.25 | 1.11 | 0.02 | 0.004 | 0.5 | 0.03 | 0.01 | 0.01 | 0.015 | 0.004 | 4.4 |
| CS 3 | 0.21 | 2.11 | 1.42 | 0.01 | 0.003 | 0.5 | 0.03 | 0.01 | 0.01 | 0.066 | 0.003 | 0.7 |
| CS 4 | 0.21 | 0.01 | 1.47 | 0.01 | 0.003 | 0.6 | 0.03 | 0.01 | 0.01 | 0.092 | 0.003 | 147 |
| CS 5 | 0.19 | 0.21 | 2.33 | 0.02 | 0.005 | 0.5 | 0.03 | 0.01 | 0.01 | 0.045 | 0.004 | 11.1 |
| CS 6 | 0.19 | 0.21 | 0.69 | 0.02 | 0.004 | 0.5 | 0.03 | 0.01 | 0.01 | 0.011 | 0.003 | 3.3 |
| CS 7 | 0.19 | 0.23 | 1.42 | 0.01 | 0.003 | 1.52 | 0.03 | 0.01 | 0.01 | 0.023 | 0.003 | 6.2 |
| CS 8 | 0.19 | 0.29 | 1.42 | 0.01 | 0.003 | 0.1 | 0.03 | 0.01 | 0.01 | 0.051 | 0.003 | 4.9 |
| CS 9 | 0.16 | 0.28 | 0.11 | 0.02 | 0.004 | 0.7 | 0.01 | 0.02 | 0.01 | 0.21 | 0.003 | 0.4 |
| CS 10 | 0.16 | 0.27 | 0.09 | 0.02 | 0.005 | 0.7 | 0.04 | 0.01 | 0.01 | 0.31 | 0.003 | 0.3 |
| IS 11 | 0.19 | 0.25 | 1.38 | 0.02 | 0.004 | 0.5 | 0.03 | 0.01 | 0.01 | 0.092 | 0.006 | 5.5 |
| IS 12 | 0.19 | 0.21 | 1.39 | 0.02 | 0.004 | 0.5 | 0.03 | 0.01 | 0.01 | 0.074 | 0.005 | 6.6 |
| IS 13 | 0.19 | 0.27 | 1.41 | 0.02 | 0.004 | 10.5 | 0.03 | 0.01 | 0.01 | 0.011 | 0.003 | 5.2 |
| IS 14 | 0.19 | 0.25 | 1.33 | 0.02 | 0.003 | 10.5 | 0.03 | 0.01 | 0.01 | 0.003 | 0.004 | 5.3 |
| IS 15 | 0.17 | 0.25 | 1.11 | 0.02 | 0.003 | 0.7 | 0.01 | 0.01 | 0.01 | 0.002 | 0.004 | 4.4 |

IS: Inventive steel
CS: Comparative steel
RE: Relational Expression

TABLE 2

| Steel type | Finish rolling temperature (° C.) | First cooling Cooling end temperature (° C.) | Second cooling condition Mid temperature (Temp) (° C.) | Maintaining time (t) (sec.) | Cooling rate (° C./s) | RE 3 ta (sec.) | t − ta | Division |
|---|---|---|---|---|---|---|---|---|
| IS 1  | 870 | 650 | 645 | 8  | 1.3  | 6  | 2   | IE 1 |
| IS 2  | 875 | 610 | 605 | 10 | 1.1  | 9  | 1   | IE 2 |
| IS 3  | 870 | 650 | 645 | 10 | 1.1  | 9  | 1   | IE 3 |
| IS 4  | 870 | 630 | 625 | 8  | 1.3  | 6  | 2   | IE 4 |
| IS 5  | 875 | 650 | 645 | 8  | 1.3  | 7  | 1   | IE 5 |
| IS 6  | 870 | 640 | 635 | 8  | 1.3  | 8  | 0   | IE 6 |
| IS 7  | 878 | 650 | 645 | 10 | 1.1  | 10 | 0   | IE 7 |
| IS 8  | 870 | 610 | 605 | 10 | 1.1  | 9  | 1   | IE 8 |
| IS 9  | 877 | 650 | 645 | 10 | 1.1  | 8  | 2   | IE 9 |
| IS 10 | 880 | 615 | 610 | 8  | 1.3  | 5  | 3   | IE 10 |
| CS 1  | 870 | 650 | 645 | 10 | 1.1  | 13 | 3   | CE 1 |
| CS 2  | 890 | 645 | 640 | 6  | 1.7  | 0  | 6   | CE 2 |
| CS 3  | 870 | 640 | 635 | 6  | 1.7  | −2 | 8   | CE 3 |
| CS 4  | 878 | 645 | 640 | 10 | 1.1  | 11 | −1  | CE 4 |
| CS 5  | 890 | 650 | 645 | 10 | 1.1  | 15 | −5  | CE 5 |
| CS 6  | 870 | 645 | 640 | 6  | 1.7  | 0  | 6   | CE 6 |
| CS 7  | 875 | 650 | 640 | 10 | 1.7  | 27 | −17 | CE 7 |
| CS 8  | 870 | 610 | 605 | 6  | 1.7  | −2 | 8   | CE 8 |
| CS 9  | 900 | 645 | 640 | 6  | 1.7  | −5 | 11  | CE 9 |
| CS 10 | 870 | 645 | 640 | 6  | 1.7  | −5 | 11  | CE 10 |
| IS 11 | 890 | 650 | 640 | <u>15</u> | 1.3  | 5  | 10  | CE 11 |
| IS 12 | 870 | 650 | 530 | <u>0</u>  | <u>21.8</u> | 14 | −14 | CE 12 |
| IS 13 | 885 | <u>790</u> | 785 | 1  | 1.1  | 20 | −10 | CE 13 |
| IS 14 | 870 | <u>530</u> | 525 | 10 | 1.1  | 14 | −4  | CE 14 |
| IS 15 | 900 | <u>630</u> | 605 | 6  | <u>5.1</u> | 7  | −1  | CE 15 |

IS: Inventive steel
CS: Comparative steel
RE: Relational Expression
IE: Inventive example
CE: Comparative example

TABLE 3

| Division | Microstructure (fraction) F + P | M + B | RE 2 $P_{CB}$ | $P_{CC}$ | $P_{CB}/P_{CC}$ | Mechanical properties YS (MPa) | TS (MPa) | YR | El (%) | (Pipe expandability)/ (steel sheet elongation) |
|---|---|---|---|---|---|---|---|---|---|---|
| IE 1  | 64 | 36 | 2439 | 1523  | 1.60 | 872  | 1194 | 0.73 | 14 | 0.89 |
| IE 2  | 61 | 39 | 2613 | 1873  | 1.40 | 912  | 1216 | 0.75 | 15 | 0.85 |
| IE 3  | 66 | 34 | 2233 | 1631  | 1.37 | 862  | 1181 | 0.73 | 15 | 0.90 |
| IE 4  | 68 | 32 | 2967 | 1953  | 1.52 | 864  | 1183 | 0.73 | 15 | 0.90 |
| IE 5  | 68 | 32 | 2670 | 1965  | 1.36 | 718  | 997  | 0.72 | 16 | 1.08 |
| IE 6  | 61 | 39 | 2801 | 1505  | 1.86 | 848  | 1195 | 0.71 | 16 | 0.91 |
| IE 7  | 62 | 38 | 2978 | 1831  | 1.63 | 966  | 1342 | 0.72 | 15 | 0.80 |
| IE 8  | 64 | 36 | 3203 | 1722  | 1.86 | 857  | 1174 | 0.73 | 14 | 0.91 |
| IE 9  | 63 | 37 | 2809 | 1818  | 1.55 | 974  | 1298 | 0.75 | 14 | 0.80 |
| IE 10 | 61 | 39 | 2918 | 1929  | 1.51 | 882  | 1225 | 0.72 | 12 | 0.88 |
| CE 1  | 52 | 48 | 2435 | 2095  | 1.16 | 963  | 1356 | 0.71 | 13 | 0.68 |
| CE 2  | 83 | 17 | 1926 | 1916  | 1.01 | 528  | 733  | 0.72 | 23 | 0.79 |
| CE 3  | 84 | 16 | 2825 | 2543  | 1.11 | 701  | 911  | 0.77 | 18 | 0.81 |
| CE 4  | 56 | 44 | 2658 | 2593  | 1.03 | 1053 | 1386 | 0.76 | 13 | 0.69 |
| CE 5  | 51 | 49 | 3091 | 2754  | 1.12 | 990  | 1356 | 0.73 | 11 | 0.69 |
| CE 6  | 70 | 30 | 2768 | 2719  | 1.02 | 805  | 1118 | 0.72 | 14 | 0.72 |
| CE 7  | 55 | 45 | 2893 | 2659  | 1.09 | 1259 | 1635 | 0.77 | 11 | 0.65 |
| CE 8  | 77 | 23 | 3135 | 2754  | 1.14 | 683  | 911  | 0.75 | 17 | 0.78 |
| CE 9  | 81 | 19 | 3179 | 2842  | 1.12 | 599  | 821  | 0.73 | 11 | 0.71 |
| CE 10 | 85 | 15 | 3263 | 2877  | 1.13 | 587  | 815  | 0.72 | 19 | 0.79 |
| CE 11 | 76 | 24 | 3075 | 2988  | 1.03 | 588  | 828  | 0.71 | 20 | 0.81 |
| CE 12 | 52 | 48 | 2763 | 2541  | 1.09 | 1154 | 1518 | 0.76 | 12 | 0.65 |
| CE 13 | 51 | 49 | 2891 | 2785  | 1.04 | 824  | 1099 | 0.75 | 15 | 0.71 |
| CE 14 | 53 | 47 | 2538 | 2516  | 1.01 | 909  | 1181 | 0.77 | 15 | 0.71 |
| CE 15 | 58 | 42 | 2681 | 20937 | 0.13 | 820  | 1138 | 0.72 | 15 | 0.73 |

IE: Inventive example
CE: Comparative example
RE: Relational Expression (In Table 3, 'F' refers to a ferrite phase, 'P' refers to a pearlite phase, 'M' refers to a martensite phase, and 'B' refers to a bainite phase, and YS refers to yield strength, TS refers to tensile strength, YR refers to a yield ratio (yield strength/tensile strength), and El refers to elongation. Here, pearlite has an area fraction of 5% or less (including 0%).)

(In Table 3, F+P is the sum of the fractions of each phase of ferrite and pearlite, and 85% or more of the total F+P fraction is a ferrite phase.)

As shown in Tables 1 to 3, in Inventive Examples 1 to 10 in which the alloy composition, component relations, and manufacturing conditions satisfy all the suggestions of the present disclosure, it can be confirmed that an intended microstructure is formed to obtain target physical properties, and an expansion ratio after pipemaking is secured at 85% or higher compared to the elongation of the base material (a hot-rolled steel sheet).

Meanwhile, Comparative Examples 1 to 12 illustrate cases in which the alloy composition limited in the present disclosure is not satisfied.

Among them, Comparative Example 1 shows a case that the content of C is excessive, and Comparative Example 7 shows a case that the Cr content is excessive, and it can be confirmed that the ta values of the Relational Expression 3 were calculated as 13 (sec.) and 27 (sec.), respectively. That is, in Comparative Examples 1 and 7, a maintaining time (second cooling, a ROT section) of a ultra-slow cooling section to secure an optimal phase fraction is excessively required, which is beyond the controllable maintaining time range in the ultra-slow cooling section of the present embodiment.

Comparative Example 2 and Comparative Example 8 show a case in which the content of C or Cr is insufficient, respectively, and these are difficult to form a hard phase during cooling after hot rolling as the ta value of Relational Expression 3 is derived to be less than 1 (sec.), such that a microstructure (a structure satisfying Relational Expression 2), intended in the present disclosure, could not be obtained.

Comparative Examples 9 and 10 show a case in which the content of Sol. Al that promotes ferrite transformation was excessive. In Comparative Examples 9 and 10, the hard phase was not sufficiently secured, so that the target level of strength could not be secured. In addition, as an oxidative inclusion having a high melting point such as $Al_2O_3$ is formed in the welding zone, stress is locally concentrated around the inclusion during expansion, which causes a problem of crack initiation.

Comparative Examples 3 and 4 show a case in which the content of Si deviates from the present disclosure, and Comparative Examples 5 and 6 show a case in which the content of Mn deviates from the present disclosure. In the comparative examples, as a content relationship of Si of Mn (corresponding to Relational Expression 1) deviates from the present disclosure or the t-ta value of Relational Expression 3 is unsatisfactory, there is a high possibility that a defect of the penetrator in the welding zone during welding, making it easier to generate cracks in the welding zone during pipemaking and expanding pipes. Indeed, the Comparative Examples above were inferior in expandability.

In Comparative Examples 11 to 15, the alloy composition and Relational Expression 1 corresponds to steels satisfying the present disclosure, but thereamong, in Comparative Examples 11 and 12, it can be confirmed that a maintaining time during second cooling is controlled to 15 sec. and 0 sec., respectively, such that the t-ta value of Relational Expression 3 does not satisfy a valid value. It can be confirmed that in Comparative Examples 13 and 14, the first cooling end temperature deviates from the range of the present disclosure, and in Comparative Example 15, the t-ta value of the Relational Expression 3 does not satisfy an effective value as the cooling rate exceeds 2.0° C./s during second cooling.

In all of the Comparative Examples 11 to 15, since the carbon distribution in the grains, which account for 50% or more as the area ratio in the entire hard phase, does not satisfy the Relational Expression 2 of the present disclosure, 80% or more of the expansion ratio after pipemaking cannot be secured compared to the elongation of the hot-rolled steel sheet.

Meanwhile, the present disclosure does not disclose Comparative Example in which the content of Sol.Al is less than 0.001%, but in this case, it causes a remarkable decrease in productivity in terms of operability, which can be understood by those skilled in the art.

The invention claimed is:

1. A method for manufacturing a hot-rolled steel sheet for an electric resistance welded steel pipe, comprising steps of:

reheating a steel slab including 0.15 wt % to 0.22 wt % of carbon (C), 0.1 wt % to 1.0 wt % of silicon (Si), 0.8 wt % to 1.8 wt % of manganese (Mn), 0.001 wt % to 0.03 wt % of phosphorus (P), 0.001 wt % to 0.01 wt % of sulfur (S), 0.001 wt % to 0.19 wt % of soluble aluminum (Sol.Al), 0.3 wt % to 1.0 wt % of chromium (Cr), 0.01 wt % to 0.05 wt % of titanium (Ti), 0.025 wt % or less of niobium (Nb), 0.035 wt % or less of vanadium (V), 0.001 wt % to 0.01 wt % of nitrogen (N), and a balance of iron (Fe) and other inevitable impurities, Mn and Si satisfying the following Relational Expression 1, to a temperature range of 1180 to 1300° C.;

finish hot rolling the reheated steel slab at a temperature of Ar3 or higher to prepare a hot-rolled steel sheet;

first cooling the hot-rolled steel sheet to a temperature range of 550 to 750° C. at a cooling rate of 20° C./s or higher;

second cooling the hot-rolled steel sheet at a cooling rate of 0.05 to 2.0° C./s within a range satisfying the following Relational Expression 3 after the first cooling;

third cooling the hot-rolled steel sheet at a cooling rate of 20° C./s or higher to a temperature range of room temperature to 400° C., after the second cooling; and coiling the hot-rolled steel sheet after the third cooling, $4 < Mn/Si < 12$     [Relational Expression 1]

where, Mn and Si mean a weight content of each element $0 \leq t-ta \leq 3$     [Relational Expression 3]

where, the ta is [250+(65.1[C])+(9.2[Mn])+(20.5[Cr])−(4.7[Si])−(4.8[Sol.Al])−(0.87Temp)+(0.00068Temp^2)], where t refers to a second cooling maintaining time (seconds, sec.), ta is a second cooling maintaining time to secure an optimal phase fraction (seconds, sec.), and Temp refers to a second cooling intermediate temperature, which means a temperature of an intermediate point between the second cooling start point and the second cooling end point, and each alloy component means a weight content.

2. The method for manufacturing of hot-rolled steel sheet for the electric resistance welded pipe of claim 1, wherein the finish hot rolling is performed in a temperature range of Ar3 to 1000° C.

\* \* \* \* \*